Patented Sept. 5, 1933

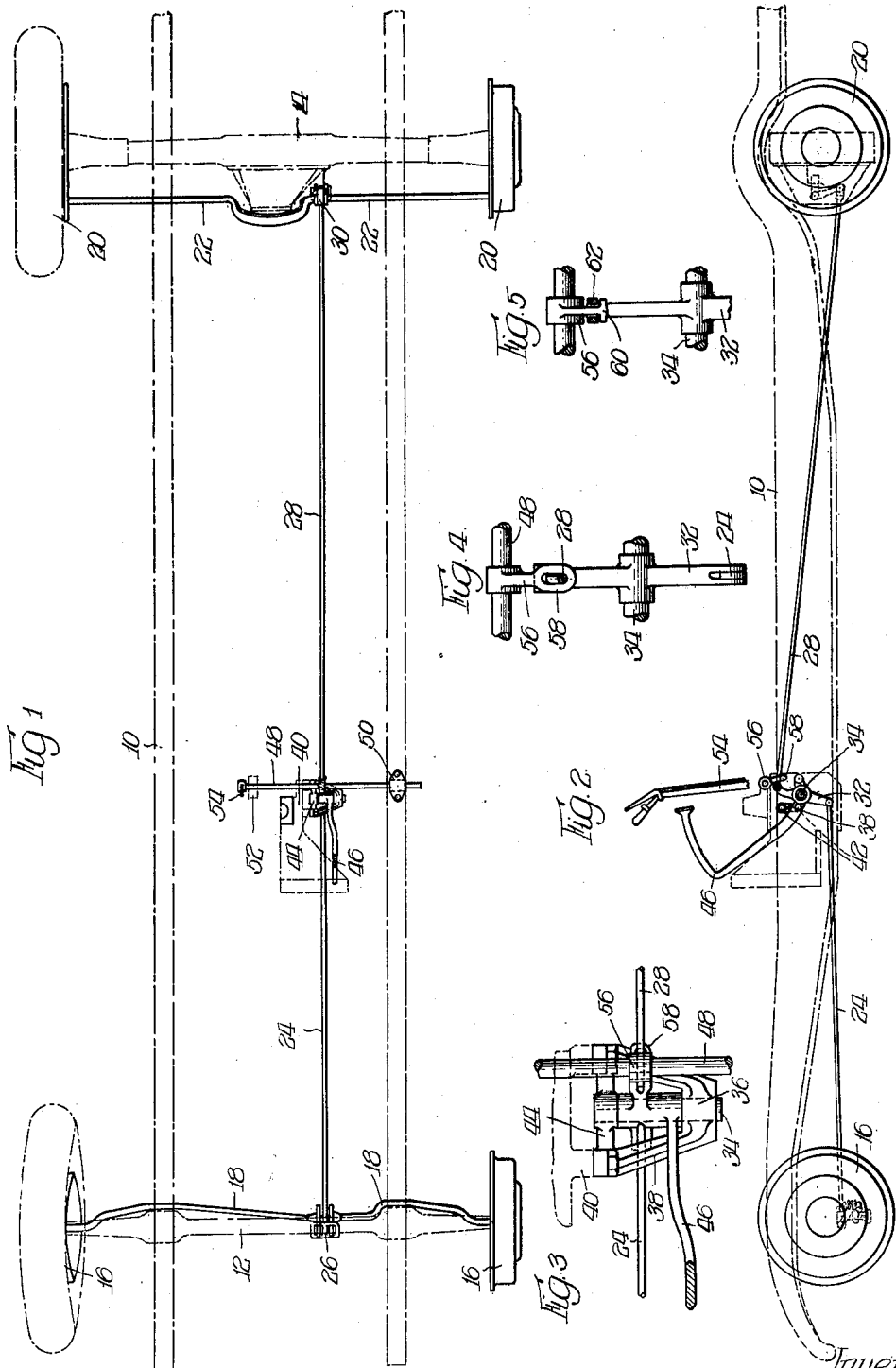

1,925,727

UNITED STATES PATENT OFFICE 1,925,727

BRAKE OPERATING LINKAGE

Edwin R. Evans, Chicago, Ill.

Application March 21, 1931. Serial No. 524,258

4 Claims. (Cl. 188—106)

This invention relates to improvements in brake operating linkage for operating the four-wheel brakes of a motor vehicle and especially relates to the improved association between the foot pedal which operates the linkage and the hand lever which similarly operates the linkage.

It is an object of the invention to so arrange the parts that failure at any one point will not result in complete failure of the brake operating linkage so that the operator will always have control of the vehicle.

It is further an object of the present invention to utilize a small number of parts in compact association whereby the manufacture and assembly is made relatively more easy.

Further and additional objects and advantages of the present invention will be more readily apparent from the following description taken in connection with the attached drawing, in which Figure 1 is a plan view of a chassis lay-out illustrating the brake linkage;

Figure 2 is a side elevation of the linkage illustrated in Figure 1;

Figure 3 is an enlarged detail plan view showing the mounting of the pedal and its relation with the brake linkage;

Figure 4 is a detail vertical section illustrating one form of connecting an arm actuated by a hand lever to the brake linkage, and Figure 5 is a similar vertical section illustrating a modified construction.

The chassis frame is diagrammatically indicated 10. The front axle is shown at 12 and the rear axle at 14. The front wheel brakes 16—16 are designed to be actuated in the usual manner by a pair of cross shafts 18—18 carried at their inner ends by the axle 12. A rear set of brakes 20—20 are similarly actuated by a pair of cross shafts 22—22 carried at their inner ends by the axle 14. I show a single pull rod 24 extending forwardly of the vehicle and suitably connected as at 26 to transmit an operative movement to the pair of cross shafts 18. A single rearwardly extending pull rod 28 is similarly connected, as at 30, to actuate the rear cross shafts and the rear brakes. The pull rods 24—28 are pivotally connected to the upper and lower ends of a double arm brake lever 32, carried by a pivot bearing shaft 34, which is supported at one end by a bearing housing 36 integral with bracket arms 38, which are attached to the transmission casing 40, at three fixed points, indicated 42 in Figure 2. The shaft 34 is supported at the other end by a fixed bearing 44. Intermediate the bearings 36 and 44 is carried the double arm lever 32, which, in the disclosed embodiment has integrally formed therewith a brake pedal 46 to be operated by the foot of the operator.

A rockable cross shaft 48 is shown supported above the shaft 34 and is carried by a bearing 50 at one end attached to the vehicle frame and an inner bearing 52, which is suitably supported in fixed relation with the frame. An emergency hand lever 54 may be secured to the shaft 48 at either end thereof. At an intermediate point on the shaft 48 there is fixed a depending lever arm 56, which is adapted to engage the rearwardly extending pull rod 28 or its connection with the double arm brake lever 32 to transmit operating movement to the brake linkage and with provision for lost motion so that the brake linkage may be actuated by the pedal without movement of the cross shaft 48.

The connection between the lever arm 56 and the brake linkage is further so designed that failure of the shaft 34 will not allow the brake linkage to drop out of operative relation with the lever 56. Figures 4 and 5 show different forms of construction for accomplishing this purpose. Thus, in Figure 4 the lever arm 56 has an eye portion 58 which receives the pull rod 28 immediately adjacent the connection of the pull rod to the double arm lever 32. In Figure 5 the lever 56 has a T-shaped head 60 adapted to engage a clevis 62 forming a connection between the pull rod 28 and the double arm lever 52.

In both forms, if the pivot for the brake lever 32 should be lost through failure of shaft 34, the pull rod 28 can become displaced with respect to the lever 56 and the operator can still actuate the rear brakes of the vehicle.

I claim:

1. Brake operating mechanism for motor vehicles comprising front and rear sets of brakes, a transverse pivot shaft supported by said vehicle, a brake lever having oppositely extending arms carried by said pivot shaft, a single pull rod pivotally connected to the depending arm of said brake lever for actuating the front set of brakes, a single pull rod connected to the upwardly extending arm of said brake lever for actuating the rear set of brakes, a rockable shaft supported by the vehicle, a hand lever connected thereto, a sub-lever connected to said rockable shaft, said sub-lever having a lost motion connection with said rearwardly extending pull rod adjacent its pivotal connection with the brake lever and said sub-lever having means for supporting said rearwardly extending pull rod and said brake lever for actuation of the rear set of brakes upon failure of the pivot shaft for the brake lever.

2. In a brake operating linkage for motor vehicles, a pair of front brakes, a pair of rear brakes, a fixed pivot, a double arm brake lever rockably supported by said fixed pivot, said brake lever including upwardly and downwardly directed lever arms, a tension-transmitting member connected to and forwardly extending from said downwardly directed lever arm for actuating said front brakes, a tension-transmitting member connected to and extending rearwardly from said upwardly directed lever arm for actuating said rear brakes, a brake pedal connected to said brake lever intermediate the connections of said tension transmitting members for actuating said front and rear brakes, a second fixed pivot, a lever arm rockably supported by said second pivot, means connecting said last-mentioned lever arm to one of said tension-transmitting members with provision for lost motion, said means serving to support said tension-transmitting member should the support from said first-mentioned pivot fail, and an emergency lever connected to the lever arm supported by said second pivot for normally actuating both the front and rear brakes and for actuating at least one pair of brakes upon failure of said first-mentioned pivot.

3. In a brake operating linkage for motor vehicles, a pair of front brakes and a pair of rear brakes, a fixed pivot, a double arm brake lever rockably supported by said fixed pivot, a brake pedal integral with said double arm brake lever, said brake lever having upwardly and downwardly directed lever arms, a tension-transmitting member connected to and extending forwardly from said downwardly directed lever arm for actuating said front brakes, a tension-transmitting drive for actuating said rear brakes, a second fixed pivot, a third lever arm rockably supported by said second fixed pivot and extending downwardly therefrom, means connecting said third lever arm to said rearwardly extending tension-transmitting member with provision for lost motion for normal actuation of both said front and rear brakes, said means serving to suspend said rearwardly extending tension-transmitting member upon failure of said first-mentioned fixed pivot, and an emergency lever for actuating said third lever arm.

4. In a brake linkage for vehicles including front and rear sets of brakes, a rockably supported brake pedal, a rockably supported emergency lever, a pivotally supported double arm brake lever, a tension member connected to and extending forwardly from one arm of said brake lever for actuating said front brakes, a tension member connected to and extending rearwardly from the other arm of said brake lever for actuating said rear brakes, said pedal being connected to said brake lever intermediate the connections of said tension members thereto, a sublever operated by said emergency lever and connected to one of said tension members with provision for lost motion relative thereto, said lost motion connection including a support for said tension member to maintain control over at least one set of brakes should failure at any point cause loss of brake control from said pedal.

EDWIN R. EVANS.